United States Patent [19]

Mueller

[11] Patent Number: 4,480,124

[45] Date of Patent: Oct. 30, 1984

[54] PROCESS FOR THE PURIFYING OF POLYTETRAMETHYLENE ETHER GLYCOL OR CORRESPONDING DIESTER

[75] Inventor: Herbert Mueller, Frankenthal, Fed. Rep. of Germany

[73] Assignee: BASF Aktiengesellschaft, Ludwigshafen, Fed. Rep. of Germany

[21] Appl. No.: 356,963

[22] Filed: Mar. 11, 1982

[30] Foreign Application Priority Data

Mar. 27, 1981 [DE] Fed. Rep. of Germany ....... 3112065

[51] Int. Cl.³ .................... C07C 67/48; C07C 41/34; C07C 41/44
[52] U.S. Cl. .................................. 560/248; 568/617; 568/621; 560/240; 260/456 R
[58] Field of Search ................ 568/617, 621; 560/248, 560/240; 260/456 R

[56] References Cited

FOREIGN PATENT DOCUMENTS

| | | | |
|---|---|---|---|
| 53-46905 | 4/1978 | Japan | 568/621 |
| 53-46906 | 4/1978 | Japan | 568/621 |
| 710842 | 6/1954 | United Kingdom | 568/621 |
| 1019166 | 2/1966 | United Kingdom | 568/621 |

OTHER PUBLICATIONS

Emmett, Catalysis, Reinhold Publishing Corp., New York, vol. 5, p. 455.

*Primary Examiner*—Howard T. Mars
*Attorney, Agent, or Firm*—Joseph D. Michaels; David L. Hedden

[57] ABSTRACT

The subject invention relates to a process for purifying polytetramethylene ether glycol or the corresponding diester prepared by cationic polymerization of tetrahydrofuran comprising treating said glycol or diester with hydrogen in the presence of a hydrogen catalyst. The resulting products have a low color number.

3 Claims, No Drawings

PROCESS FOR THE PURIFYING OF POLYTETRAMETHYLENE ETHER GLYCOL OR CORRESPONDING DIESTER

BACKGROUND OF THE INVENTION

1. Field of the Invention

The subject invention relates to a process for purifying polytetramethylene ether glycol or the corresponding diester prepared by the cationic polymerization of tetrahydrofuran. These products are purified by treating them with hydrogen in the presence of a hydrogenation catalyst.

2. Description of the Prior Art

The polymerization of tetrahydrofuran (THF) with the aid of oxonium ions as catalysts has become generally known by the basic work conducted by H. Meerwein and his associates. See, for example, *Applied Chemistry*, vol. 72, page 927, (1960).

Used as catalysts are either premanufactured compounds or those which are produced in situ. The following premanufactured trialkyloxonium salts are useful as catalysts:
$[(C_2H_5)_3O] SbCl_6$; $[(C_2H_5)_3O] BF_4$; $[(C_2H_5)_3O] FeCl_4$; and $[(C_2H_5)_3O] AlCl_4$.

In order to prepare such catalysts, Lewis acids such as $BF_3$, $AlCl_3$, $SnCl_4$, $SbCl_4$, $SbCl_5$, $FeCl_3$ or $BF_3$ are reacted with ethylene oxide, epichlorohydrin, orthoesters and acetals, α-chloroether, benzylchloride, triphenylmethylchloride, acetylchloride or β-propiolactone as well as inorganic hydrogen acids such as $HClO_4$, $HBF_4$, $HSO_3F$, $HSO_3Cl$, $H_2SnCl_6$, $HIO_3$, $HSbCl_6$ or $HFeCl_4$ which can be used together with carboxylic acid anhydrides, carboxylic acid chlorides, $SOCl_2$, $POCl_3$ and benzenesulfonic acid chloride as well as aluminum alkyl compounds in combination with epichlorohydrin or water.

This list, which does not claim to be complete, describes the most important systems known to date and shows that there is an immense multitude of catalysts with which polytetramethylene ether glycols (PTHF) or the corresponding diesters can be produced. However, only a few catalysts have achieved industrial importance since only they permit the production of polymers which satisfy the market requirements as far as chemical and physical properties are concerned. A drawback of these catalysts is that they generally result in a polymer having a tendency to turn yellow or brown. The discoloration of the polymers becomes deeper as the temperature at which the tetrahydrofuran was polymerized, increases.

Technical grade tetrahydrofuran contains slight quantities of impurities in a concentration of 10 to 500 ppm. The chemical nature of these impurities is not completely known. Although this technical grade tetrahydrofuran is basically of very high purity (it normally has a degree of purity of >99.9 percent) these trace impurities evidently cause the above-referenced discoloration during polymerization. In addition to this, these impurities affect the reactivity during the preparation of polyesters of polyurethanes from the polytetramethylene ether glycol. Since color and reproducible processing are important characteristics for a polymer intended for industrial application, there is a need to eliminate the problems resulting from the impurities.

U.S. Pat. Nos. 3,980,672, 3,935,252 and 2,751,419 as well as German Published application No. 2,801,792 (U.S. Pat. No. 4,189,566) describe treatment methods for transforming technical grade tetrahydrofuran into a polymerizable monomer by pretreatment with zeolithic molecular sieves, strong mineral acids, organic sulfonic acids, silica gel or bleaching earths. Whereas the treatment described in the U.S. applications primarily causes the resultant polymers to have a residual acid number which does not require removal, the treatment with bleaching earths described in German Published application No. 2,801,792 results in the production of polymers with improved color number. It has been found, however, that these treatment methods cannot be used in a manner which is reproducible in every case and cannot be used with every technical grade tetrahydrofuran obtainable in the marketplace. The processes according to the above-referenced U.S. Patents further have the drawback that unreacted tetrahydrofuran must be carefully dried and purified prior to reuse since it originates from the wet processing of the polymer.

Evidently tetrahydrofuran contains different impurities. Since the impurities in most cases are not accurately identified, it cannot be foretold in every case by analytical methods whether the quality of the tetrahydrofuran is suitable for the polymerization. Therefore, and in spite of the pretreatment of the monomer, polymers which do not meet specifications are produced repeatedly.

There is a pressing need for developing a treatment method for polytetramethylene ether glycols or their diesters which facilitates removal of all impurities occurring in the polymer which are detrimental to further processing.

SUMMARY OF THE INVENTION

The subject invention relates to a process for purifying polytetramethylene ether glycol or the corresponding diester prepared by cationic polymerization of tetrahyrdrofuran, comprising treating said glycol or diester with hydrogen in the presence of a hydrogenation catalyst. The resulting products have a low color number.

DESCRIPTION OF THE PREFERRED EMBODIMENTS

Polymers in the sense of this invention are polymers of tetrahydrofuran with degrees of polymerization greater than 2. A low color number means that the polytetramethylene ether glycols or diesters, after the treatment according to this invention, have a HAZEN color number (APHA process) of, for instance, less than 40 HAZEN. The determination of these color numbers is described in DIN standard 53409 and ASTM-D 1209.

The process according to this invention can be used for all polymers which are obtained by cationic polymerization of tetrahydrofuran which are presently commercially available. It does not make any difference if the tetrahydrofuran was produced on the basis of acetylene and formaldehyde, maleic anhydride, allyl alcohol or butadiene. In all cases, polytetramethylene ether glycols or diesters with color numbers down to 10 APHA (according to DIN No. 53 409, July 1967) could be obtained.

In accordance with this invention, the polymers are treated with hydrogen in the presense of commonly used hydrogenation catalysts. A primarily existing yellowish or brownish color of the polymers disappears almost instantly and colorless products having an acid number of zero are produced.

This result was all the more surprising since it is known that most of the applied manufacturing processes for tetrahydrofuran involve a synthesis whereby butyne diol is hydrogenated under very severe reaction conditions (temperatures above 100° C. and hydrogen pressure greater than 200 bars). Since a dehydrogenation of either the tetrahydrofuran monomer or the polymer can be assumed at any reaction stage, it had to be assumed that a subsequent hydrogenating treatment of the polymer would not be effective. It could also not have been predicted that the acid number in the polymers would disappear by the hydrogenating treatment.

Another advantage is that equipment intensive decolororizing purification of the polymer with activated charcoal, for instance, such as that disclosed in U.S. Pat. No. 3,935,252 or 2,751,419, can be eliminated. The hydrogenating treatment according to this invention takes place successfully under unexpectedly mild conditions with the amount of hydrogen consumed for the color removal being immeasurably small.

It should also be mentioned that a particular advantage of the process of this invention is that the polymerization itself can now be conducted at a much higher temperature than otherwise possible. The color of the resultant polymers depends upon several other factors among which is the selected polymerization temperature. The higher the selected temperature, the greater is the discoloration in the resultant products. However, since it does not make any difference for the treatment as to whether a more or less discolored polymer is subjected to the hydrogenating treatment, the polymerization can now generally be conducted at higher temperatures and subsequently the color can be removed by the purification process according to this invention. Moreover, using higher temperatures causes a higher rate of reaction and a narrowing of the molecular weight distribution in the polymer.

As already stated above, polytetramethylene ether glycol or the corresponding diester can be produced with the most diverse initiator systems. These initiator systems determine the end groups of the primarily obtained polymer. Of technical importance are those processes which result in polymers containing saponifiable end groups. These are particularly ester groups of carboxylic acids or sulfonic acids. Since the polytetramethylene ether glycol is needed with hydroxyl end groups for its primary area of application, which is the polyurethane sector, the polymers containing esters of fluorosulfonic acid or carboxylic acid are saponified in a stage following the polymerization. It is a particular advantage of this process that the hydrogenating treatment can take place with the primary polymers so that these also are accessible in a colorless pure form should this be required. Of course the polymers can be subjected to the hydrogenating treatment in the hydroxyl form with equal success.

In accordance with this invention, the polymers can be treated with hydrogen in the presence of hydrogenation catalysts under normal pressure or at elevated pressures, for instance, 1 to 300 bars. Since the application of additional pressure brings about hardly measurable advantages compared with non-pressurized mode of operation, the hydrogenation is preferably carried out under pressures of up to 60 bars, particularly 15 bars to 50 bars of hydrogen.

The hydrogen treatment can take place at room temperature or increased temperatures, for instance, 50° C. to 150° C. In this case also, however, it can be noted that this temperature increase does not offer significant advantages compared with hydrogenation temperatures of 15° C. to 70° C., particularly 20° C., to 60° C., so that hydrogenation temperatures of 20° C. to 60° C. are used on a preferred basis.

Suitable hydrogenation catalysts contain the metals of the eighth sub-group of the Periodic Chart, particularly nickel, cobalt, an iron as well as the noble metals ruthenium, palladium or platinum, and copper. The metals may be used in their pure form, for instance, as Raney metals or, for instance, as reduced oxides. However, catalysts containing the hydrogenation metals on suitable supports such as aluminum oxide, silicon oxide, pumice, bentonite or, for instance, magnesium silicate are preferred. The catalysts containing metals such as iron, cobalt, nickel and copper are advantageously transferred into the active form prior to application by means of reduction with hydrogen. If noble metal catalysts are used, such an operation is in most cases unnecessary.

The techniques commonly used for hydrogenations are used for implementing the hydrogenating treatment of the polymers for removal of the color and for reducing the acid number. The work is carried out in the liquid phase with the trickle or sump method being used with fixed bed catalysis. The hydrogenation can be carried out very successfully, however, using a suspended catalyst. The chemical nature of the impurities originally contained in the polymer causing the discolorations or the acid number is unknown, and the impurities are contained in the polymer in hardly detectable concentrations. Therefore, it cannot be determined either how the method according to this invention affects the polymer.

Polytetramethylene ether glycols having very high molecular weights are advantageously subjected to the hydrogenating purification in a solvent. Suitable solvents include tetrahydrofuran itself or, for instance, lower alcohols such as methanol, ethanol, propanol and butanol. It has proven to be particularly advantageous that the purification stage can immediately follow the polymerization stage. The polymerization takes place as a function of the selected reaction temperature until an equilibrium concentration is achieved. For 40° C. to 50° C., for instance, this is reached at 50 to 60 percent of reacted tetrahydrofuran. Immediately after leaving the polymerization zone—possibly after neutralization of the cationic catalyst—this solution can be transported to the hydrogenation area. Non-reacted tetrahydrofuran is subsequently reclaimed by distillation and can now be directly recycled to the polymerization stage without prior purification.

The parts referred to in the examples which follow are parts by weight unless otherwise specified.

EXAMPLE 1

Polytetramethylene ether glycol having a molecular weight of 2000, which was produced and saponified in accordance with German Published application No. 2,445,961 (British Pat. No. 1,512,526) with antimony pentachloride as catalyst and acidic anhydride as regulator is hydrogenated in a reciprocating agitator autoclave at 50° C. and 50 bars of hydrogen in the presense of 1 percent by weight of Raney nickel for a period of 5 hours. The polymer used had a color number of 70

APHA and an acid number of 0.08 mg KOH/gram. After hydrogenation and separation of the catalyst by filtration, a polymer is obtained which has a color number of 5 APHA and an acid number of 0.

EXAMPLE 2

As described in U.S. Pat. No. 3,935,252, tetrahydrofuran is polymerized with fluorosulfonic acid between 25° C. and 35° C. The polymer is processed by hydrolysis and treated with calcium hydroxide as described in the cited patent application under Example 4. The material is not treated with activated charcoal. After drying, a polymer is obtained which has a color number of 90 APHA.

This polymer is hydrogenated for 3 hours in a reciprocating mixing autoclave at 50° C. and under 50 bars of hydrogen in the presence of 1 percent of a catalyst bed consisting of 0.5 percent platinum on aluminum oxide. After filtration of the catalyst, a colorless polytetramethylene ether glycol (color number <5 APHA) having an acid number of 0 is obtained.

EXAMPLE 3

Tetrahydrofuran is polymerized in accordance with a method of continuous polymerization on bleaching earth as catalyst an acidic anhydride as regulator as described in German Published application No. 2,916,653 (U.S. Pat. No. 4,189,566). The pretreatment for the purification of commercially available tetrahydrofuran also described in this published application is not carried out. Technical grade tetrahydrofuran by BASF Aktiengesellschaft is used for the polymerization. In accordance with the method described in Example 3 of the published application, a polytetramethylene ether glycol diacetate having a molecular weight of 650 is produced. This polymer has a color number of 100 APHA. If it is converted to polytetramethylene ether glycol by means of hydrolysis, it has a color number of 110 APHA and an acid number of 0.05 mg KOH gram. If, on the other hand, the polytetramethylene ether glycol diacetate leaving the reactor is directed from bottom to top over a catalyst bed consisting of 3 mm silica gel strands containing 0.4 percent palladium and if gaseous hydrogen is introduced, a decoloration takes place. The product leaving the hydrogenation now has a color number of less than 10 APHA. The catalyst load is 0.4 kg polymer solution per liter of catalyst and hour. The amount of hydrogen introduced per hour is 1 Nl/liter of polymer solution. If the hydrogenated polymer solution is separated from the excess tetrahydrofuran and the resultant diacetate is saponified, a polytetramethylene ether glycol is finally obtained which has a color number of approximately 15 APHA and an acid number of 0 mg KOH/gram.

The embodiments of the invention in which an exclusive privilege or property is claimed are defined as follows:

1. A process for purifying polytetramethylene ether glycol or its corresponding diester prepared by the cationic polymerization of tetrahydrofuran comprising treating said polytetramethylene ether glycol or diester with hydrogen in the presence of a hydrogenation catalyst.

2. The process of claim 1 wherein the hydrogenation catalyst is selected from the group consisting of nickel, cobalt, copper, iron, ruthenium, palladium, platinum, and oxides thereof.

3. The process of claim 2 wherein said catalyst is supported on a fixed bed composed of a compound selected from the group consisting of aluminum oxide, silicon oxide, pumice, bentonite, and magnesium silicate.

* * * * *